United States Patent
Powell et al.

(10) Patent No.: US 10,318,804 B2
(45) Date of Patent: Jun. 11, 2019

(54) SYSTEM AND METHOD FOR DATA EXTRACTION AND SEARCHING

(71) Applicant: First American Financial Corporation, Santa Ana, CA (US)

(72) Inventors: Calvin Powell, Villa Park, CA (US); Chris Rubio, Oceanside, CA (US); Raza Khan, Corona, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 502 days.

(21) Appl. No.: 14/319,790

(22) Filed: Jun. 30, 2014

(65) Prior Publication Data

US 2015/0379343 A1 Dec. 31, 2015

(51) Int. Cl.
| | |
|---|---|
| *G06F 3/048* | (2013.01) |
| *G06K 9/00* | (2006.01) |
| *G06F 16/22* | (2019.01) |
| *G06F 16/93* | (2019.01) |
| *G06K 9/62* | (2006.01) |

(52) U.S. Cl.
CPC ......... *G06K 9/00469* (2013.01); *G06F 16/22* (2019.01); *G06F 16/93* (2019.01); *G06K 9/6289* (2013.01); *G06K 2209/01* (2013.01)

(58) Field of Classification Search
CPC ........ G06K 9/00469; G06K 9/72; G06K 9/80; G06K 9/00449; G06K 9/0042; G06F 17/30011; G06F 17/30312
See application file for complete search history.

(56) References Cited

U.S. PATENT DOCUMENTS

| | | | | |
|---|---|---|---|---|
| 6,400,845 B1* | 6/2002 | Volino | ................ | G06K 9/2054 358/462 |
| 7,916,972 B2* | 3/2011 | Meunier | ............ | G06K 9/00449 382/175 |
| 8,620,079 B1* | 12/2013 | Rubio | ................ | G06K 9/00442 382/173 |
| 8,787,681 B1* | 7/2014 | Rubio | ................ | G06K 9/00442 382/224 |
| 9,141,853 B1* | 9/2015 | Rubio | ................ | G06K 9/00469 |
| 2005/0108211 A1* | 5/2005 | Karimisetty | ...... | G06F 17/30911 |
| 2006/0282442 A1* | 12/2006 | Lennon | ............ | G06F 17/30011 |
| 2007/0217715 A1* | 9/2007 | Newcomer | ........ | G06K 9/00469 382/305 |
| 2010/0135579 A1* | 6/2010 | Newcomer | ........ | G06K 9/00469 382/190 |
| 2010/0202698 A1* | 8/2010 | Schmidtler | ........ | G06K 9/00469 382/195 |

(Continued)

*Primary Examiner* — Andrew T Chiusano
(74) *Attorney, Agent, or Firm* — Sheppard, Mullin, Richter & Hampton LLP

(57) ABSTRACT

Systems and methods are provided for quickly and efficiently searching and receiving results for real estate-related information without or at least with minimal human processing of real estate-related documents. Optical character recognition on a plurality of scanned document images is performed to obtain a plurality of textual data representations of the real estate-related documents. Data is extracted from the textual data representations, and subsequently contextualized according to a real estate-related context. Aspects of the extracted data as well as the textual data representations are provided as search results based on one or more searches for real estate-related information.

19 Claims, 9 Drawing Sheets

(56) References Cited

U.S. PATENT DOCUMENTS

| | | | |
|---|---|---|---|
| 2010/0246999 A1* | 9/2010 | Tillberg | G06K 9/00442 |
| | | | 382/309 |
| 2011/0025842 A1* | 2/2011 | King | G06F 17/211 |
| | | | 348/135 |
| 2012/0102002 A1* | 4/2012 | Sathyanarayana | |
| | | | G06F 17/30303 |
| | | | 707/687 |
| 2012/0173521 A1* | 7/2012 | Lam | G06F 17/30648 |
| | | | 707/734 |
| 2012/0323562 A1* | 12/2012 | Bayer | G06F 17/30253 |
| | | | 704/9 |
| 2013/0166547 A1* | 6/2013 | Pasumarthi | G06Q 10/06 |
| | | | 707/728 |
| 2013/0347050 A1* | 12/2013 | Friel | H04N 17/00 |
| | | | 725/133 |
| 2014/0032406 A1* | 1/2014 | Roach | G06Q 20/042 |
| | | | 705/42 |
| 2015/0012529 A1* | 1/2015 | Emanuel | G06F 17/30651 |
| | | | 707/722 |
| 2015/0302084 A1* | 10/2015 | Stewart | G06F 17/30705 |
| | | | 707/776 |

* cited by examiner

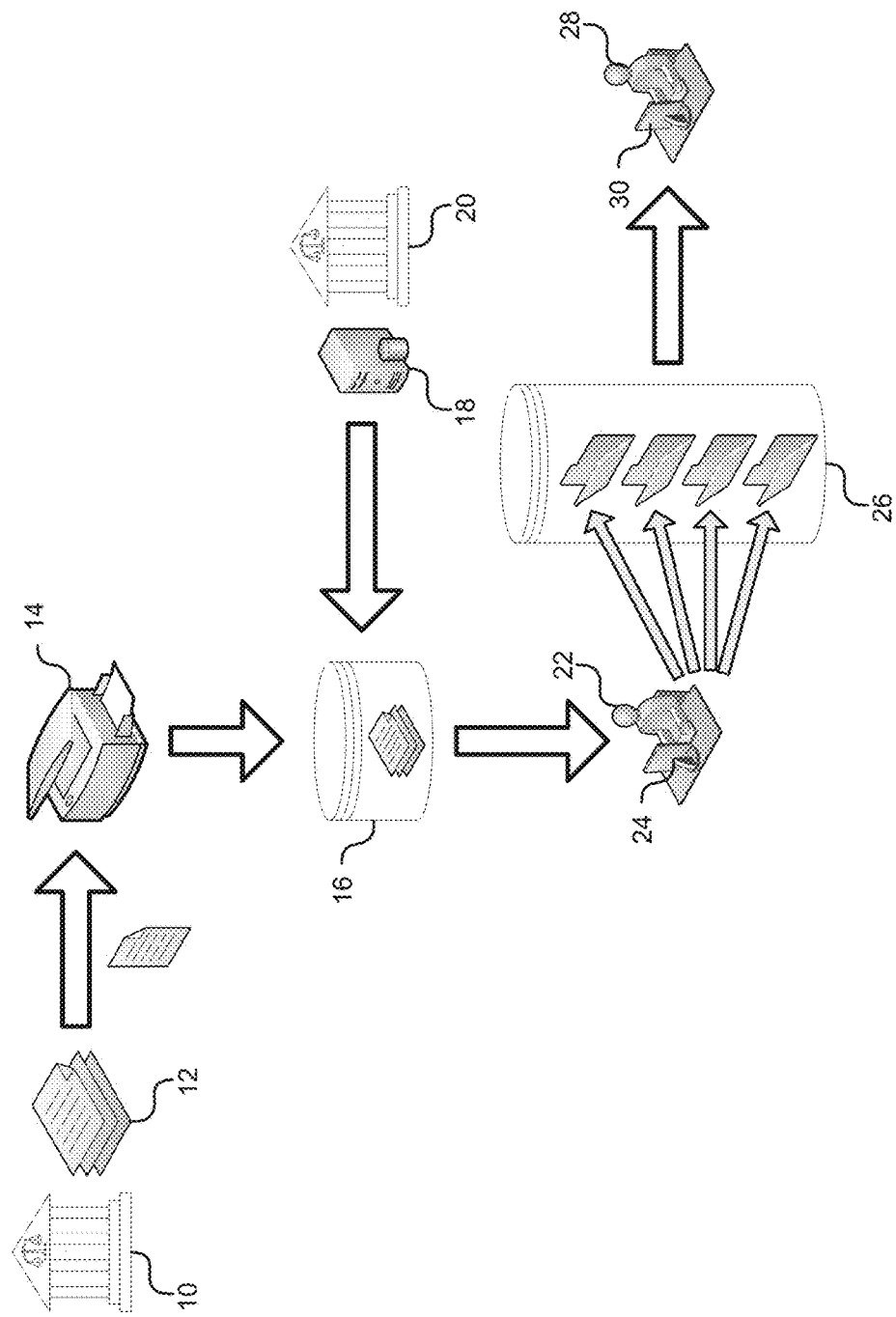
FIG. 1
(CONVENTIONAL)

SYSTEM AND METHOD FOR DATA EXTRACTION AND SEARCHING

TECHNICAL FIELD

The present disclosure relates generally to document processing. In particular, some embodiments relate to producing textual data representations of digital documents, extracting data, and searching for information in an efficient and useful manner.

DESCRIPTION OF THE RELATED ART

For some time now, computers have had the ability to convert and store physical documents into digital documents. Generally, the conversion involves using a document scanner attached to a computer to scan the physical document and convert the resulting digital representation to a computer image file, such as, for example, a bitmap image (BMP) file, a Tagged Image File Format (TIFF) file, or a Joint Photographic Experts Group (JPEG) file. Following the scan, the image file of the document may be post-processed using optical character recognition (OCR) software, which locates characters within the image of the document (whether they are handwritten, typewritten, or printed) and translates them to computer-readable text. Subsequently, the resulting computer-readable text is typically saved to a computer document file, such as a text file, Portable Document File (PDF) or a Microsoft® Word document, from which the characters of the document can be readily recognized or modified using a computer.

With the world becoming increasingly digital, the desire to convert physical records to digital form accessible by computers has become commonplace. This is especially true in industries, such as health care and real estate, where heavy reliance is placed on computer technologies such as document scanners and OCR software to convert the physical records into digital records. For example, in the real estate industry, both business and government entities are currently involved in converting physical real estate documents stored at public records offices to digital documents. Once converted, these digital documents, which may or may not be post-processed using OCR software, may be categorized by business entities to make them easier to locate and review during real estate transactions (e.g., when generating a real estate title report). Additionally, the conversion allows for information stored in field within these digital document (i.e., field content) to be readily extracted (e.g., grantor information from the grantor field in a deed)

BRIEF SUMMARY OF THE DISCLOSURE

In accordance with one embodiment, a non-transitory computer-readable medium has computer executable program code embodied thereon, the computer executable program code being configured to cause a computer system to perform the following operations: perform image pre-processing on a document image; perform optical character recognition on the document image; create a textual data representation of the document image; apply processing rules to the textual data representation; perform one or more extractions based on the processing rules to extract data from the textual data representation and contextualize the extracted data; perform automated validation of the contextualization of the extracted data; store the extracted data and the textual data representation in a full text index database; and transfer the extracted data and the textual data representation to a search engine platform, the search engine platform indexing and storing the extracted data to allow for searching of the indexed, extracted data, the indexed, extracted data having been correlated to the textual data representation.

In accordance with another embodiment, a computer-implemented method comprises receiving a plurality of scanned document images representative of real estate-related documents. The method further comprises performing optical character recognition on the plurality of scanned document images to obtain a plurality of textual data representations of the real estate-related documents. Additionally still, the method comprises extracting data from the textual data representations of the real estate-related documents, and contexualizing the extracted data in a real estate-related context. One or more elements of the extracted data and the textual data representations are then provided as search results based on one or more searches for real estate-related information.

In accordance with yet another embodiment, a system may include an optical character recognition module configured to perform optical character recognition on a plurality of scanned document images to obtain a plurality of textual data representations of the real estate-related documents. The system may also include an extraction module configured to extract data from the textual data representations of the real estate-related documents, and contextualize the extracted data in a real estate-related context. Further still, the system can include a search engine platform configured to provide at least one of the extracted data and the textual data representations as search results based on one or more searches for real estate-related information performed via the search engine platform.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 1 is a flowchart illustrating a conventional method for processing real-estate-related public documents for data extraction.

Figure 2A:
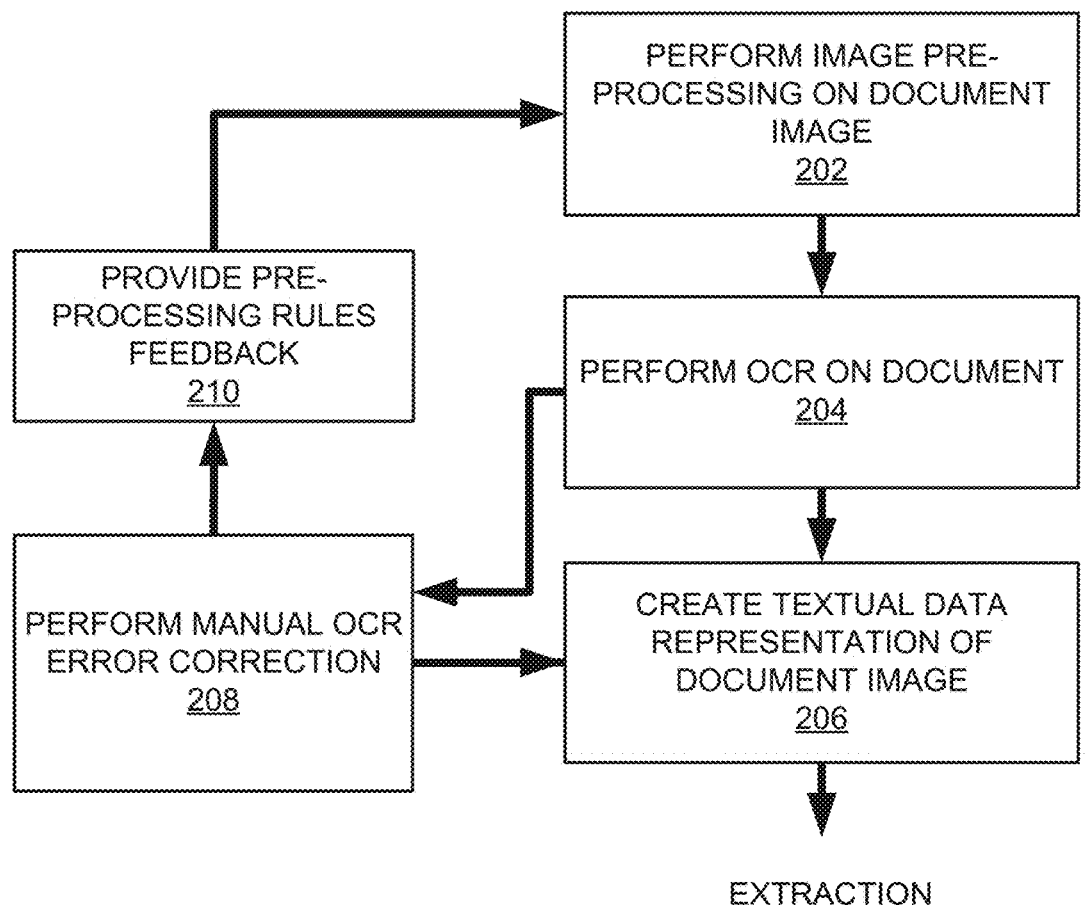
FIG. 2A is a flowchart illustrating an example method for OCR processing in accordance with various embodiments of the present disclosure.

The figures are not intended to be exhaustive or to limit various embodiments to the precise form disclosed. It should be understood that various embodiments can be practiced with modification and alteration.

DETAILED DESCRIPTION

Various embodiments described in the present disclosure are directed toward systems and methods for extracting information (content) from digital documents. The extracted information may be stored and contextualized, while a mechanism is provided for searching the extracted information in an efficient and contextually relevant manner.

FIG. 1 is a diagram illustrating one conventional method by which business entities classify digital documents and extract information from fields therein. The conventional method can be utilized in a variety of contexts/environments, one of which is the real-estate industry. As illustrated in FIG. 1, public documents at public records offices 10 and 20 may be stored either as physical documents 12 or as digital documents on a server 18. Presently, some real estate companies (e.g., title insurance companies) may aggregate real estate-related public documents from these sources 10 and 20 for storage on their own private database 16 for use during real estate transactions. When the public documents are already stored at the public records offices as digital documents, e.g., public records office 20, real estate companies may simply gain access to server 18 of public records office 20 (i.e., via a feed) and electronically collect data via that access.

However, when the public documents are only available in physical form, real estate companies first obtain physical documents 12 from public records office 10 and then convert them to digital documents using, for example, a document scanner 14. To make the digital documents retrieved from sources 10 or 20 computer-searchable, the digital documents are can be processed using, e.g., OCR software. That is, OCR software can convert or translate text of the digital document, a text image, into computer readable text. The result text of an OCR operation performed on a digital document can be thought of as being "unstructured." That is, an OCR operation does not assign or other place the converted computer readable text in any sort of context.

Additionally, digital and physical documents from public records offices 10 and 20 are usually uncategorized when retrieved or difficult to automatically extract information from, due to a lack of digital field delineations or varying field labels. As such, both digital and physical documents are typically analyzed by a human analyst to classify the document or to designate where field information is located within the document. For example, a human analyst might determine that a digital real estate document is a deed of trust and designate which portion of the digital real estate document provides grantor information for a grantor field.

Although existing OCR technologies can perform limited levels of digital document categorization and field extraction from digital documents, such OCR technologies generally rely on a standardized document structure. However, real estate documents often have document structures that can vary from one jurisdiction to another (e.g., country-to-country, state-to-state, county-to-county, etc.). Some real estate documents may lack a document structure altogether (e.g., a handwritten real estate document). Consequently, it is has been difficult for computers to automatically ascertain via OCR alone, what document classification certain real estate documents belong to, and what fields of those real estate documents contain what information. In other words, performing an OCR process on a digital document merely results in textual data being output in an "unstructured" manner. That is, there is no context associated with the textual data. For example, an OCR process may output a text document having various words, names, numbers, etc. However, what those words, names, numbers, etc., may mean or what they may be related to/associated with remains unknown.

Therefore, real estate companies often resort to conventional methods of document classification and field information extraction. This can involve a large number of human analysts 22 reviewing digital real estate documents on a computer 24 and electronically designating what document classifications 26 the digital real estate documents belong to, and what portions of the digital real estate documents contain fields of interest. Eventually, a user 28 (e.g., a title analyst) interested in accessing or searching the categorized digital real estate documents or field information extracted can access them through by way of a computer 30.

It should be noted that using conventional methods of data extraction, large amounts of information remain uncollected. That can be due to such information not falling within the parameters of what may be considered a "critical" field depending on, e.g., the type of document at issue, the type of industry in which documents are utilized, etc. For example, information that can be found in real estate-related documents that is left uncollected can include, but is not limited to the title of a document, entities involved, name of escrow, name of homeowner association (HOAs) organizations, mortgage rates, and relevant dates, even though such information can be useful and monetized if it were captured. Additionally, the time and resources required to process digital documents using the aforementioned conventional methods and systems can already be costly and time consuming, making extracting any and all information from a digital document undesirable and impractical in most cases. For example, upwards of $900,000 can be spent in a single month on data extraction of real estate documents in a 400 counties (out of, e.g., a possible 3000). According to some estimates, there can be over 1000 additional fields in real estate-related documents from which information could be collected but are currently left un-mined. Hence, only critical information or information deemed to be of most value by an entity other than an end-user is generally collected.

Therefore, in accordance with various embodiments, systems and methods are provided for extracting any and all information or content from a digital document using technology that need not necessarily rely on human data extraction. Such extracted information or content can be stored in a full text indexed database, where the extracted information or content is stored in an unstructured manner, e.g., document fields need not be identified as being critical fields beforehand (as is conventionally done). Additionally, systems and methods of quickly and efficiently searching this unstructured extracted information or content are also provided, allowing a user to specify at his/her discretion how/what data is searched for and returned.

Figure 2B:
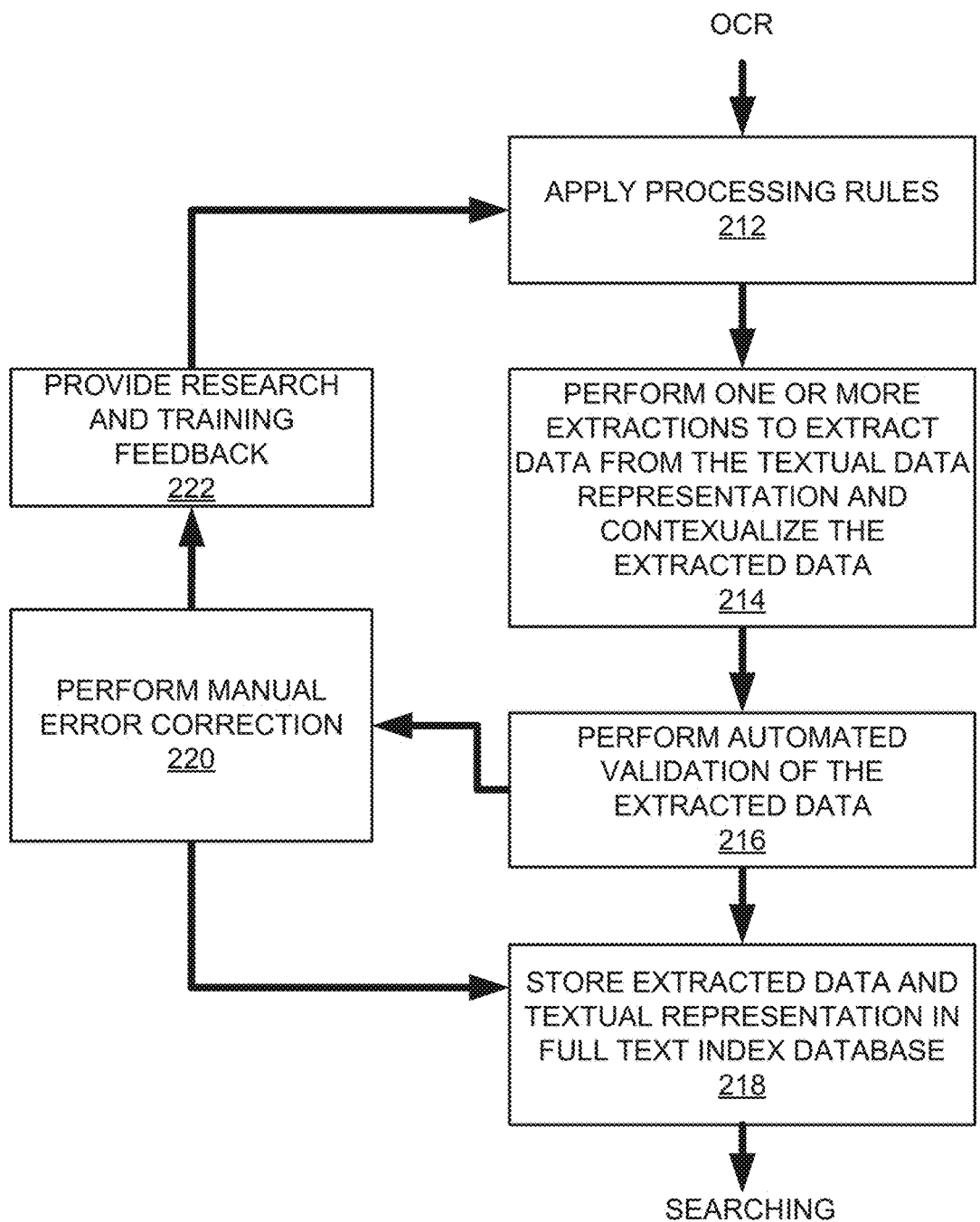
FIG. 2B is a flowchart illustrating an example method for data extraction in accordance with various embodiments of the present disclosure.
Figure 2C:
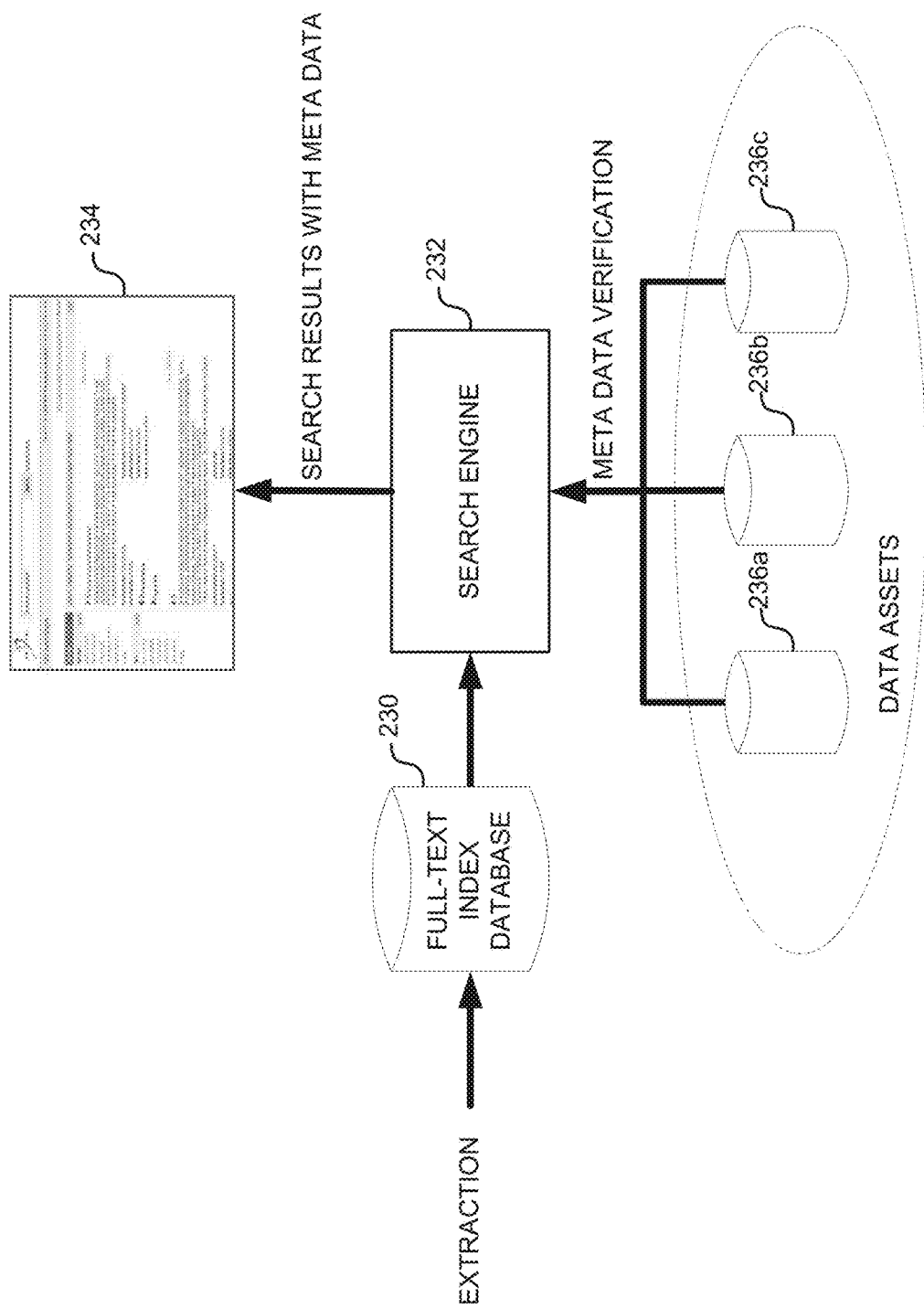
FIG. 2C is an example architecture and method for searching in accordance with various embodiments of the present disclosure.

To achieve the aforementioned functionality, a digital document/image of a document may undergo an OCR process to convert the digital document to a (high quality) text file. It should be noted that the requisite quality of an OCR'ed document can vary as desired according to the particular industry in which various embodiments are utilized and/or other constraints, requirements, needs, etc. FIGS. 2A-2C illustrate an example overview of an operational workflow for OCR'ing a document image, extracting data from the OCR'ed document image, and searching for the extracted data in accordance with various embodiments.

FIG. 2A illustrates an example OCR process performed in accordance with various embodiments. At operation 202, image pre-processing can be performed on a document image, e.g., a document that has been scanned into some digital image format, such as a BMP, TIFF, JPEG, etc. Image pre-processing can involve one or more techniques to "fine-tune" a document image. For example, image pre-processing may include, but is not limited to straightening lines, filling in missing words or letters in some character string, and completing a character string. Another example of image pre-processing may include determining that a character is actually an "o" rather than a "0," that a character is a "3" rather than a "B," etc. In the context of determining what a character is, for example, image pre-processing can determine whether some character is a number rather than a letter prior to attempting to recognize the character as a letter and extract it as such. That is image pre-processing can be utilized to improve the quality of or otherwise refine the output of the OCR process.

At operation 204, OCR conversion of the (scanned) document image is performed. As a result of the OCR conversion, a textual data representation of the document image is created at operation 206. Further refinement of the OCR process can occur through the performance of manual OCR error correction at operation 208. As described above, one or more human analysts, such as human analyst 22 of FIG. 1 may manually review the textual data representation of the document image to further refine or improve the quality of the OCR process. That is, the aforementioned automated aspect(s) of the OCR process may still result in certain errors. For example, image pre-processing may not correctly distinguish between all the letters and numbers present in the document image, in which case, the human analyst can manually correct any remaining issues not correctly converted by the OCR process.

At operation 210, feedback is obtained as a result of the manual OCR correction performed at operation 208, and this feedback may then be translated into one or more pre-processing rules that can be incorporated into the image pre-processing operation at 202 for use in performing subsequent OCR operations and/or to re-OCR the document image. Such pre-processing rules can include, but are not limited to de-speckling, binarization, line removal, and the normalization of aspect ratio and scale. The use of such feedback allows the OCR process to learn and continually improve its output in accordance with various embodiments.

It should be noted that subsequent to the creation of a textual data representation of the document image at 206, the textual data representation of the document image can be further processed using one or more extraction methods as will be described in greater detail below. It should be further noted that a textual data representation of the document image of sufficient quality or accuracy can be produced without the use of feedback, and/or over time, the OCR process may become sufficiently accurate after incorporating enough feedback and refining of the image pre-processing rules. In the context of re-OCR'ing a document image, the document image may undergo one or more subsequent OCR processes to determine whether additional/more accurate textual data can be gained after the image pre-processing has been adjusted to account for, e.g., any updated rules used for fine-tuning the document image.

After the document image undergoes the aforementioned OCR process, the resulting textual data representation or file may then undergo an extraction process. FIG. 2B illustrates an example extraction process performed in accordance with various embodiments. At operation 212, processing rules may be applied to the textual data representation result of the OCR process. As will be discussed in greater detail, one or more extraction techniques or methods can be applied to a textual data representation of a document image. Each of these extraction techniques or methods may have or may be associated with certain processing rules in accordance with which each of the extraction techniques or methods may be performed.

One such extraction method can be referred to as natural language processing (NLP) extraction. Extraction based on NLP can allow data (character strings) such as numbers, pronouns, character strings that, e.g., look like an address, character strings that appear to be a proper noun, e.g., a name, etc. to be extracted from the textual data representation of the document image, processing rules can be developed and relied upon to extract such data. That is, underlying linguistic structures and relationships grammatical rules, context, etc., in textual data may be analyzed to extract relevant data from the textual data representation of the document image. Thus, patterns in documents can be identified and utilized to extract information following such patterns.

Another extraction method that may be employed in accordance with various embodiments can be referred to as coordinate-based extraction. In coordinate-based extraction, it is known, or it can be assumed that at a particular position/location of a digital document, certain information exists. For example, and in the context of some real estate-based documents, it may be known that an attorney involved in a real estate transaction described in the real estate-based document should be located at, e.g., the top left-hand corner and one inch from the top of the real estate-based document. Accordingly, instructions or rules can be written and utilized to extract data at a particular location, where the extracted data can be assumed to be a particular type of data.

Similar to coordinate-based extraction, quadrant-based extraction is another extraction method that may be used in accordance with various embodiments to extract data. Some document images may be received in a compressed format. For example, an original document may physically exist on/in an 8.5×14 paper/format, but upon scanning (prior to the OCR process), the document image may be compressed to an 8.5×11 format. Accordingly, extracting certain information can no longer rely on the location/coordinates, e.g., one inch from the top, relative to its original format, but rather a converted location or quadrant may be utilized to extract data, e.g., 0.75 inches from the top (based on the applied compression).

Regular expression extraction may be another extraction technique utilized in accordance with various embodiments. A regular expression can be a pattern describing a certain amount of text, where a match to that pattern, e.g., some piece of text or character sequence, can be searched for in the textual data representation of the document image. That is, a search can be performed for a term or phrase that is known to exist in a document. Additionally, some area around or relative to the identified expression can be extracted. For example, a search for the regular expression "initial interest rate" can be performed. If some data, e.g., character string, is formatted in a manner that looks like a number or some numerical value, and it is near or around some area relative to where that regular expression was found, such as to the left of a percentage symbol that is near the expression "initial interest rate," that character string can be assumed to be a number reflecting the initial interest rate. That data may then be extracted.

It should be noted that processing rules can be applied and utilized in one or more extraction processes for teaching an extraction engine(s) how to extract information in a desired manner, e.g., as it applies to certain documents in the real estate industry. For example, in an NLP context, processing rules may be utilized to teach how NLP is to be optimized and applied to real estate documents. When extracting information from a document classified/characterized as an attorney document, the attorney document can be processed using a coordinate-based extraction engine, as it can be assumed that attorneys rely on known form documents, where information can be extracted based on position/location. If however, the document is classified/characterized as some other type of document that may not lend itself to coordinate-based extraction, the processing rules will instruct the system and method to extract information using a different extraction engine/method, e.g., an NLP extraction engine/method.

At operation 214, one or more extractions may be performed to extract data from the textual data representation of the document image and contextualize the extracted data. The one or more extractions may be performed in accordance with one or more processing rules applicable to one of the aforementioned extraction techniques or methods. It should be noted that other extraction techniques may be used in place of or in addition to those already mentioned in accordance with various embodiments, as may be deemed necessary or preferable depending on the desired extraction, needs, etc. of a particular document/document image type or format, industry in which various embodiments are utilized, etc.

At operation 216, an automated validation process can be performed to confirm the validity of any extracted data. The automated validation process may be performed using existing data or data assets. That is, and once the extracted data has been associated with a context, that extracted data can be compared to existing data or data assets (e.g., previously processed documents or extracted and contextualized data) to confirm whether or not the associated or otherwise applied context is true or valid. For example, extracted data may be an extracted name, and that extracted name may be contextually associated with an address of a particular real estate property. Existing data or data asserts may be accessed for comparison to determine whether the extracted name has been previously associated with the address of the particular real estate property, whether the address is a valid address, etc. Moreover, automated validation may involve accessing, e.g., county websites and performing screen scraping to determine that a person identified by the extracted name should/actually "belongs" or is otherwise associated with the address.

Similar to the manual error correction and feedback associated with the previously described OCR process, manual error correction and be performed at operation 220. Research and training feedback based on the manual error correction can be provided to update and/or adjust the processing rules at operation 222. For example, extracted data may still erroneous, e.g., the extracted data results in a character string "be3n." Manual error correction can be utilized to determine whether the character string should read "been." It should be noted that such errors can also be validated as part of automated validation operation 218 depending on what existing data or data assets are utilized for comparison.

In conjunction with the manual error correction and feedback operations 220 and 222, accuracy of the applied extraction method(s) or technique(s) can be measured and analyzed. For example, manual error correction operation 220 may reveal that the applied extraction method(s) results in a 90% accuracy rate. If 90% accuracy is predetermined to be a threshold, anytime one or more extraction methods results in a measured accuracy of less than 90% results in feedback requiring adjustment of/training for the one or more extraction methods.

At operation 218, the extracted data is stored in a full text index database. That is, the textual data representation of a document image that has resulted from the aforementioned OCR process may be stored within the full text index database. Additionally, any and all extracted data, i.e., metadata, gleaned from the aforementioned extraction process may also be stored in the full text index database. In a real estate-related document, for example, the extracted data/metadata can include, but is not limited to, e.g., the following: title of the real estate-related document; associated state and county information; address, assessor's parcel number (APN) assigned to a particular real estate property; any relevant party names; a type of document or document classification; document number, recording date; any reference document(s) that may be related to the real estate-related document; and any legal description of the real estate property.

The extracted data/metadata can be utilized as or can be used to provide an index for "attaching" existing data or data assets. In other words, the full text index database can provide a mechanism by which existing data or data assets may be tied to the extracted data to thereby grow a real estate-related knowledge base, and allow a search to be performed (as will be described in greater detail below) that can provide relevant results. For example, a search performed for a particular name can result in any document in which that name appears. Hence, the extracted data, in a search context, can be reference points that link the relevant documents.

FIG. 2C illustrates an example architecture and associated processes for searching in accordance with various embodiments. As previously described, the textual data representation of a document image may be stored within a full text index database 230, as well as any and all extracted data/metadata obtained from the extraction process. In one embodiment, text index database 230 may have a NoSQL (flat structure) database allowing for fast searching.

The textual data representation of a document image and any extracted data/metadata can be placed on a search engine platform 232. Search engine platform 232 allows for the selection of which fields or types of data stored in full text index database 230 are to be placed onto search engine platform 232. Search engine platform 232 may then "tokenize" the selected data, thereby separating and sorting the selected data into categories, such as nouns, pronouns, etc. Thus, search engine platform 232 may create its own index or indices around/relevant to textual data representations and extracted data/metadata and store it (internally) according to its own structure. Application programming interfaces (APIs) may then be provided to allow searching of that index or indices, which have now been related to or associated with the textual data representations. This allows a user to efficiently search for any data in any stored textual data representation.

It should be noted that the indexing performed at search engine platform 232 allows search engine platform 232 to tune itself to provide fast/efficient searching. Additionally, search engine platform 232 may be further tuned from, e.g., an industry perspective based on how a real estate business entity may want to have search results presented and/or how quickly the search results are returned at 234. This additional tuning can be based on the use of "facets" and how such facets are built into search engine platform 232. Facets can refer to, e.g., categories or similar indications implemented within search engine platform 232 that allow for filtering of returned search results, where the facets can be tailored to the underlying data, business entity needs, industry context, etc. For real estate-related documents, relevant facets may include, but are not limited to types of real estate-related documents, a date range associated with real estate-related documents, and a county associated property at issue in real estate-related documents.

It should be noted that the utilization of facets further instructs search engine platform 232 how best to access desired information/data in accordance with one embodiment. For example, in the real estate industry, it is known that names, dates, and document titles are critical types of information. Accordingly, when data from full text index database 230 is fed to search engine platform 232, data is assigned/associated with those critical types to allow search engine platform 232 to be aware that when a user searches for data, the user is likely going to search in a manner commensurate with/for critical types of data. Over time, as more searches are conducted on search engine platform 232, search engine platform 232 may learn how users conduct searches, although initially, search engine platform 232 can be given a default search methodology/structure.

FIG. 2C further illustrates additional data assets 236a-236c, which can be utilized to provide metadata verification in accordance with various embodiments. That is, documents that have undergone the aforementioned OCR and extraction processes may not contain "all" relevant data therein. For example, in the real estate context, documents such as a deed assignment, rider or other addenda, etc. may only contain certain information or data, relying on a reference document to contain additional requisite information. Accordingly, additional data assets 236a-236c can be accessed and used to correlate extracted data and/or full text representations with reference documents. Additional data assets 236a-236c may be, e.g., a title plant, such as those maintained by title companies, which host additional title, home, and/or owner information, grantor/grantee databases that index real estate properties by sellers' and buyers' names, etc.

Figure 3:
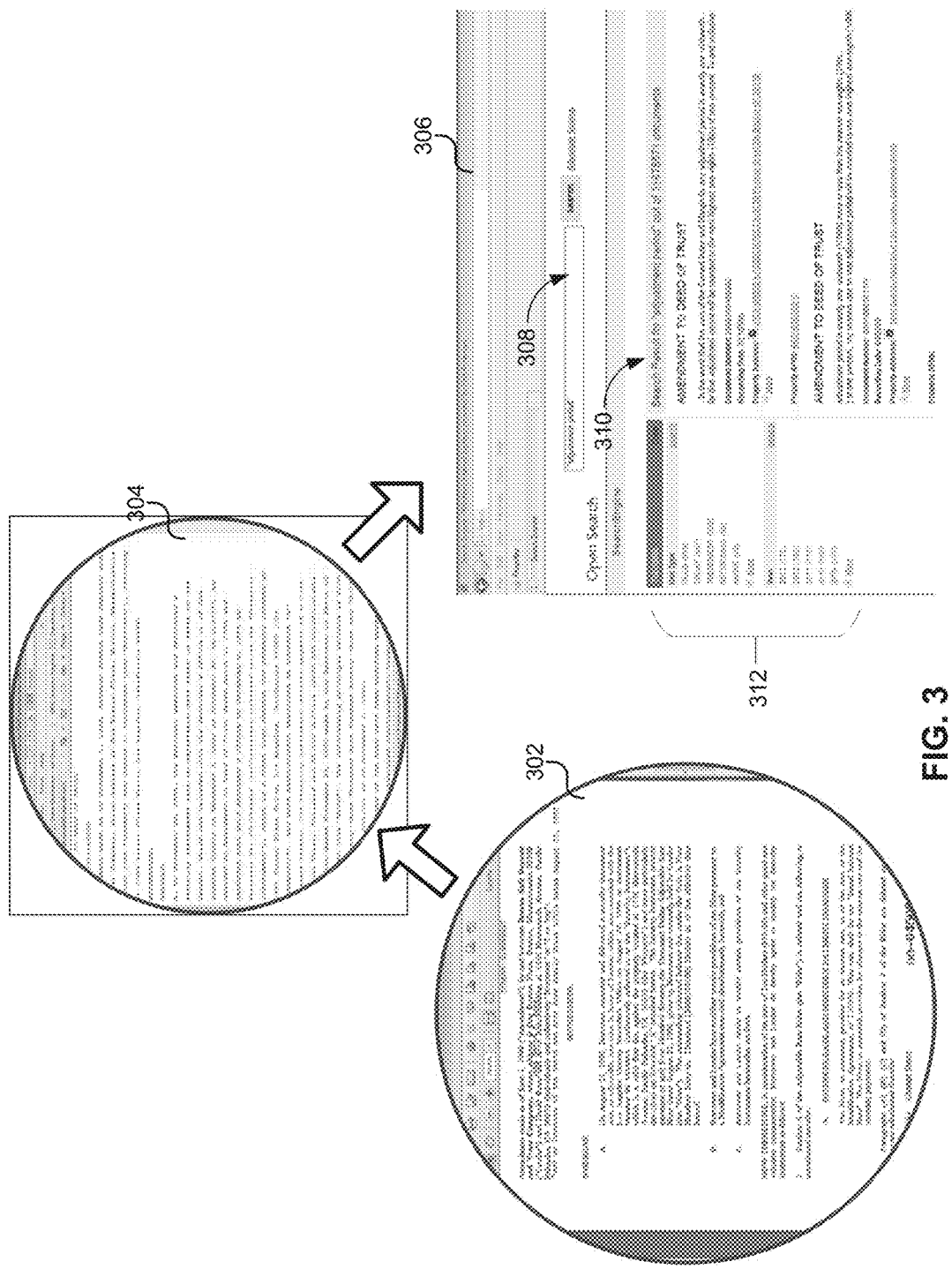
FIG. 3 is an example overview of the OCR, extraction, and searching functionality in accordance with various embodiments of the present disclosure.

FIG. 3 illustrates an example visual representation of a document undergoing the aforementioned OCR and extraction process, as well as a possible search in accordance with various embodiments. A snapshot of a (scanned) document image 302 is shown in FIG. 3, where document image 302 may undergo an OCR process as previously described. Document image 302 may contain a plurality of different types of data ranging from party names to numerical values representative of monetary data, relevant dates, reference documents, etc. As a result of undergoing the OCR process in accordance with various embodiments, a textual data representation 304 of document image 302 is created. As previously described, document image 302 may undergo more than one OCR process in order to obtain a textual data representation of sufficient quality. Upon creation of textual data representation 304, an extraction process is performed to extract, e.g., metadata as also described above, where textual data representation 304 and any extracted metadata is stored in a full text index database, e.g., full text index database 230 of FIG. 2C.

Upon being placed and indexed in a search engine platform, e.g., search engine platform 232 of FIG. 2C, a user may conduct a search. As illustrated in FIG. 3, a web-based search engine graphical user interface (GUI) 306 is utilized to allow the user to interact with the search engine platform, although some embodiments may implement a stand-alone/local search engine platform interface application, or other appropriate implementation. In this example, a user may perform a search 308 on any desired data using one or more search terms, e.g., text-based letter, word, phrase, or other expression, such as "adjustment period." The search engine platform, having stored and aggregated a plurality of textual representations of document images, extracted and contextualized data/metadata from such textual representations, as well as accessed existing data/data assets, and/or linked correlated or other reference documents as previously described, is then able to process the user's search and return results 310.

Search results 310 can be displayed to the user via a short "preview" showing portions of each document returned where the search term is found. Additionally, the search term can be highlighted in these relevant portions of the document to assist the user in determining which documents may be of interest. Moreover, links to the document image (in this example, hyperlinks) can be provided, allowing the user to see, download, or otherwise access the "original" document for further review. Links to reference or otherwise related documents can also be provided to the user. Facets 312 allow the user to drill down or further refine his/her search results 310. As described above, in the real estate context, applicable facets that can be built into the search engine platform may include, e.g., the types of document the phrase "adjustment period" appears in, such as "DEEDS," "TRUSTS," "AMENDMENTS," etc., as well as relevant date ranges associated with the documents returned in the search results.

It should be noted that various embodiments are contemplated to operate with very large amounts of documents. FIG. 3 illustrates that 31,675,571 documents have been returned in a search result. Despite the search engine platform having to process a search amongst such a large amount of documents, a user can still quickly search through and find relevant documents, e.g., on the order of seconds. A user may also have the flexibility to use broad search terms, such as a single name or a name with some parameters, such as deed or address, allowing for intuitive searching. As described above, the search engine platform can be tuned or otherwise optimize to return search results quickly.

Figure 4:
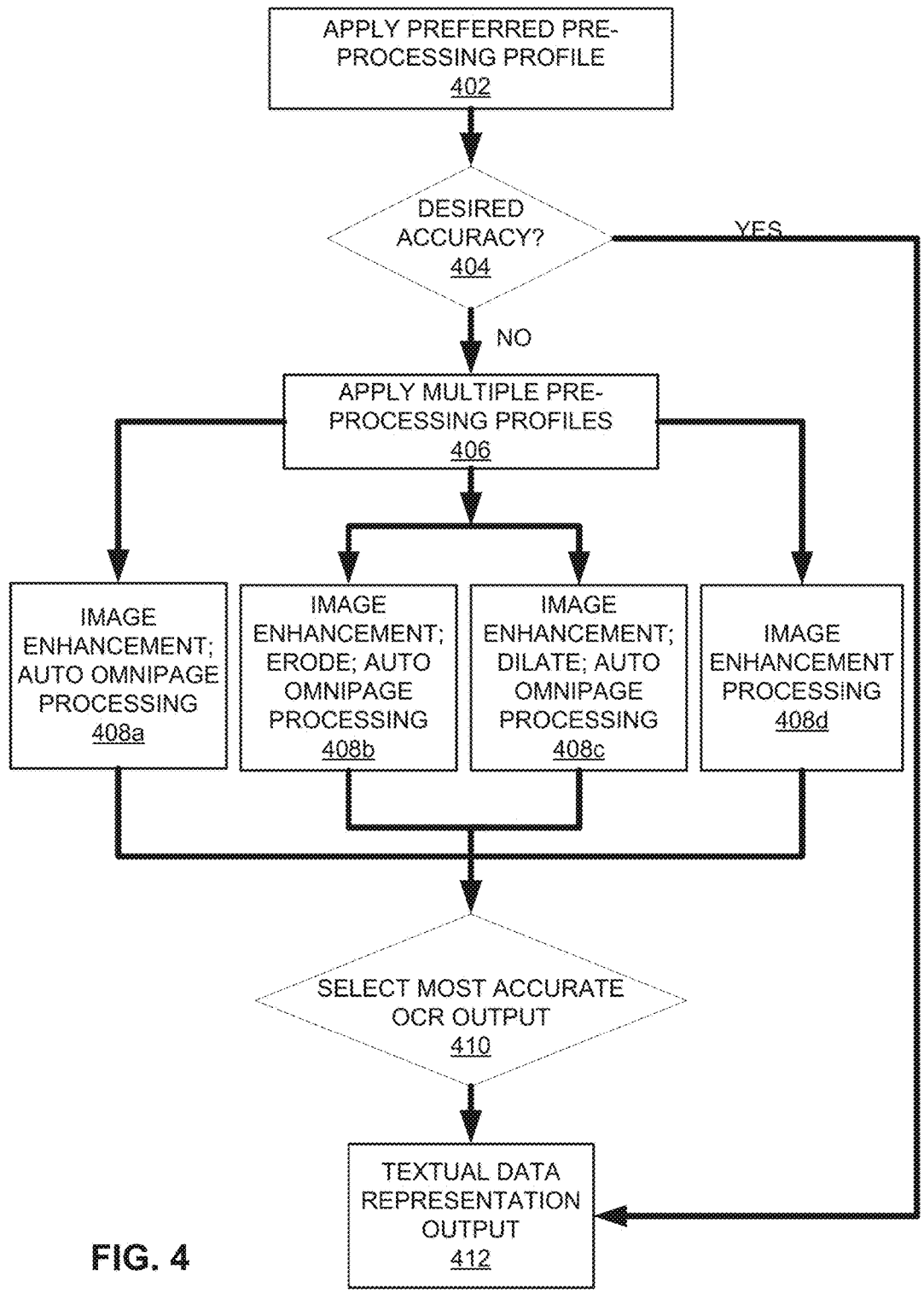
FIG. 4 is a flowchart illustrating a detailed example method for OCR processing in accordance with various embodiments of the present disclosure.

FIG. 4 illustrates a detailed operational flow diagram of example processes that may be performed to OCR a document image in accordance with various embodiments. As alluded to previously (and illustrated in FIG. 2A), a document image can be OCR'ed to obtain a textual data representation of the document image. More particularly, a preferred pre-processing profile is applied at operation 402. As described above, image pre-processing can involve one or more techniques to "fine-tune" a document image, such as straightening lines, filling in missing words or letters in some character string, and completing a character string. Accordingly, a pre-processing profile having the requisite type(s) of tuning or refinement characteristics can be applied to one or more document images as determined by, e.g., a system administrator, business entity, etc.

At operation 404, it can be determined whether or not the resulting textual data representation of the document image has the desired accuracy, again in accordance with the needs and/or preferences of a business entity, system administrator, human analyst, etc. If the desired accuracy has been met by the applied pre-processing profile, the textual data representation of the document can be output at 412 (to undergo extraction).

If the desired accuracy has not been met (e.g., as determined by a human analyst performing manual error correction, for example), multiple pre-processing profiles can be applied or utilized to re-OCR the document image at operation 406. A first profile 408a can be a combination of pre-processing methods to enhance the image using various image enhancement methods such as deskewing, line removal, and/or or cleaning up the document image to remove noise, such as stray dots from the document image, while OmniPage refers to an OCR tool provided by Nuance Communications, Inc., that includes various pre-processing functionality that can be automatically applied. A second profile 408b can be another combination of pre-processing methods including the aforementioned image enhancement, auto-Omnipage and Erode processing, where erosion processing can refer to one technique for analyzing and processing structures in, e.g., binary or grayscale images, to shrink or otherwise reduce boundary regions of foreground pixels. A third profile 408c can have a combination of pre-processing methods including the aforementioned image enhancement, auto-Omnipage and Dilate processing, where dilation processing can refer to one technique for analyzing and processing structures in, e.g., binary or grayscale images, to enlarge boundary regions of foreground pixels. A fourth profile 408d may include solely the aforementioned image enhancement processing.

After applying or using each of the aforementioned pre-processing profiles 408a-408d to OCR the document image, the most accurate textual data representation of the document image can be selected at operation 410. Selection of the most accurate textual data representation (OCR output) can be performed by comparing the OCR output to the document image, for example, and measuring accuracy. Upon selecting the most accurate OCR output, the textual data representation of the document image is output at 412 for extraction.

Figure 5:
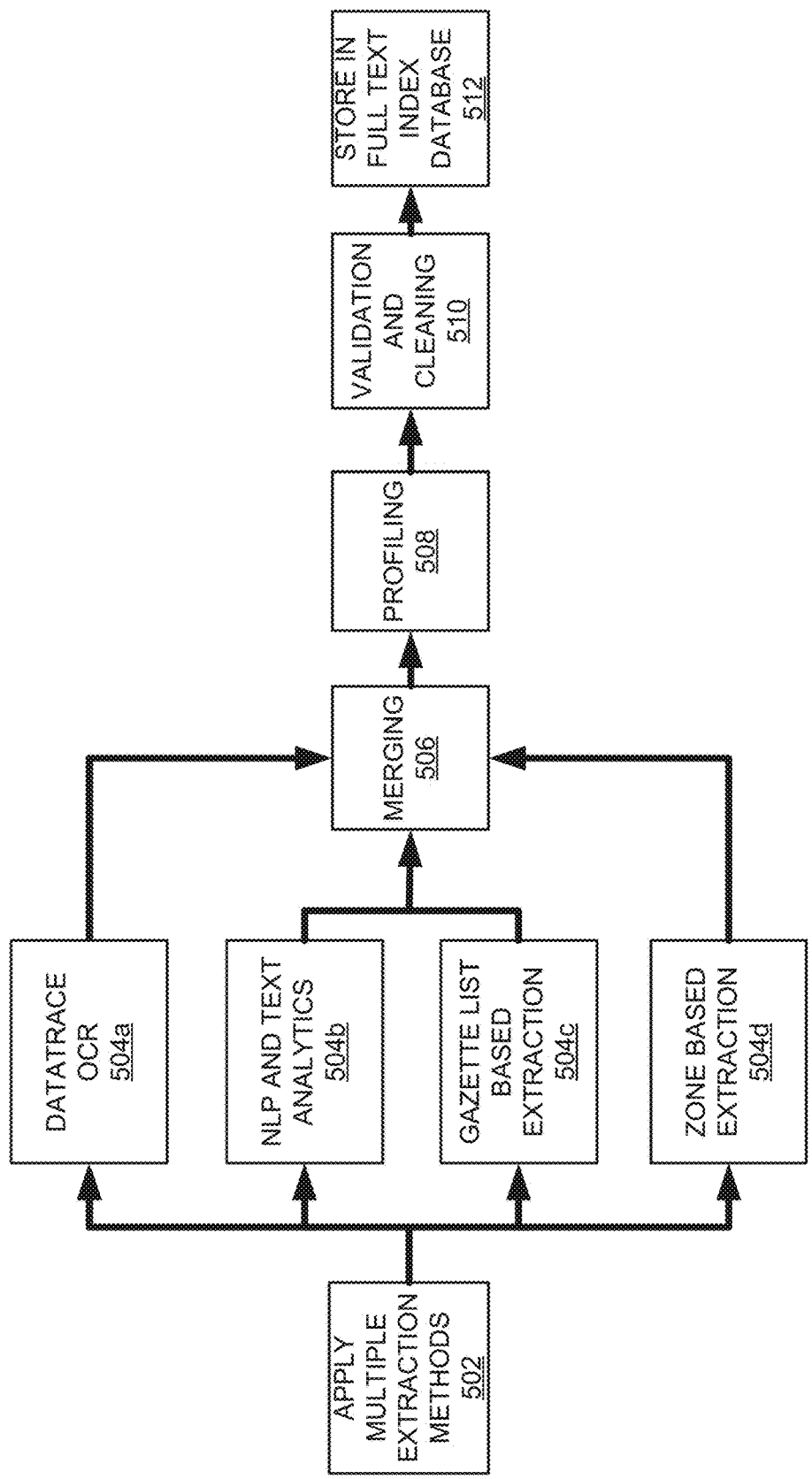
FIG. 5 is a flowchart illustrating a detailed example method for data extraction in accordance with various embodiments of the present disclosure.

FIG. 5 illustrates a detailed operational flow diagram of example processes that may be performed to extract data/metadata from the textual data representation of a document image in accordance with various embodiments. As alluded to previously (and illustrated in FIG. 2B), one or more extractions can be performed on a textual data representation of the document image to extract data/metadata which can be contextualized and eventually searched. More particularly, a multiple extraction methods can be applied to the textual data representation of the document image at operation 502. Application of the multiple extraction methods can include DataTrace OCR extraction 504a, NLP and text analytics extraction 504b, Gazette list based extraction 504c, and Zone based extraction 504d, which refer to various tools that manage various extraction techniques such as smart extraction, location and phrase based identification of required extraction fields, and the use of gazette lists for common terms that need to be identified and extracted.

The results of the aforementioned extractions can be merged at operation 506, and profiled (contextualized) at operation 508. Thereafter, validation and cleaning can be performed at operation 510, as previously described. At operation 512, the extracted data/metadata can be stored in full text index database 512.

It should be noted that the systems and methods described herein can be configured to extract/validate/OCR information in accordance with various settings, parameters, and/or other constraints or instructions. The systems and methods described herein may also be configured as desired, where the parameters and/or profiles can be adjusted, added to, deleted from, in accordance with learned or observed patterns, for example, over time. For example, the proper method(s) or techniques for extracting information from a particular type of document may be learned and applied to subsequent instances of that particular type of document in future operations/iterations. Additionally, one or some combination of multiple extraction methods (described herein or other extraction methods) may be utilized in accordance with various embodiments to achieve optimal data extraction. In the case of multiple extraction methods being utilized, extraction results may be weighted in order to achieve optimal extraction results.

Depending on the embodiment and the digital documents, the digital documents discussed herein may be received in a variety computer file formats, including, for example, an image file, a PDF file, or a Microsoft® Word document file.

Figure 6:
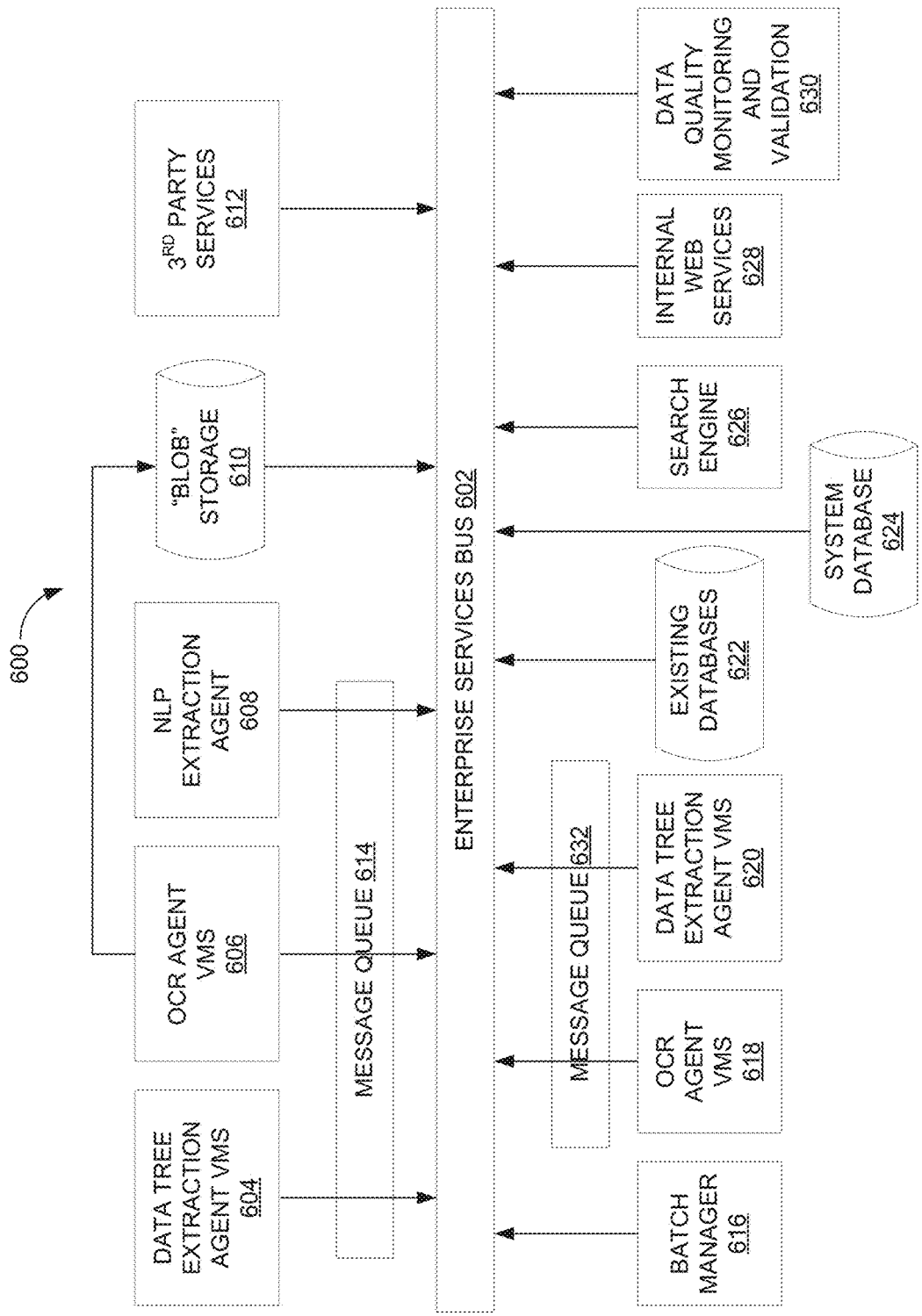
FIG. 6 is an example system architecture of a business entity data center in which various embodiments of the present disclosure may be implemented and utilized.

FIG. 6 illustrates an example system architecture for implementing the OCR, extraction, and search functionalities described herein. System 600 may be a business entity data center. It should be noted that the various elements of system 600 may be generally co-located at a data center location or may be distributed across one or more systems or networks. System 600 may include an enterprise services bus 602 on or over which various system elements may connect and/or interact. In particular, routing, mediation, transformation, security, management, and monitoring tasks can occur over enterprises services bus 602.

Multiple OCR and extraction functions can be implemented in hardware, software, firmware, etc., or some combination thereof. FIG. 6 illustrates system 600 as including, for example, data tree extraction agent virtual machines 604 and 620, OCR agent virtual machines 606 and 618, and an NLP extraction agent virtual machines 608. Such OCR/extraction entities may communicate via message queues 614 and 632. Furthermore, OCR agent virtual machines 606 may output OCR'ed document images to "blob" storage 610 in which, e.g., OCR "mega-files" and textual data representations of document images can be stored.

System 600 may further include a batch manager 616 for handling/invoking batch processing of documents. Existing data/data assets can be accessed via existing databases 622, while system 600 may maintain its own system database 624, where databases 622 and 644 can be internal assets or external assets such as specialized providers/data repositories of specialized information, e.g., terrorist watchlists, credit score vendors, flood plain vendors, etc. The aforementioned verification and cleaning functionality may be implemented via third party services 612 (or alternatively, with internal services in accordance with other embodiments), while data quality monitoring and validation can be provided via one or more data quality monitoring and validation modules/services 630.

System 600 may further include search engine 626 to allow searching the textual data representations of the document images and extracted data. As previously described, searching can be performed via a web-based search engine. Accordingly, internal web services can be handled by internal web services module(s) 628 for effectuating communication/data interaction via the various engines, hardware, software described herein. It should be noted that any appropriate web service may be utilized in accordance with various embodiments, including but not limited to, REST-compliant web services and interactions via SOAP messages.

It should be noted that although various embodiments are described herein with respect to real estate-related documents, one of ordinary skill in the art reading this description would fully appreciate and understand that the various embodiments could be used with documents from other fields and industries not pertaining to real estate.

Figure 7:
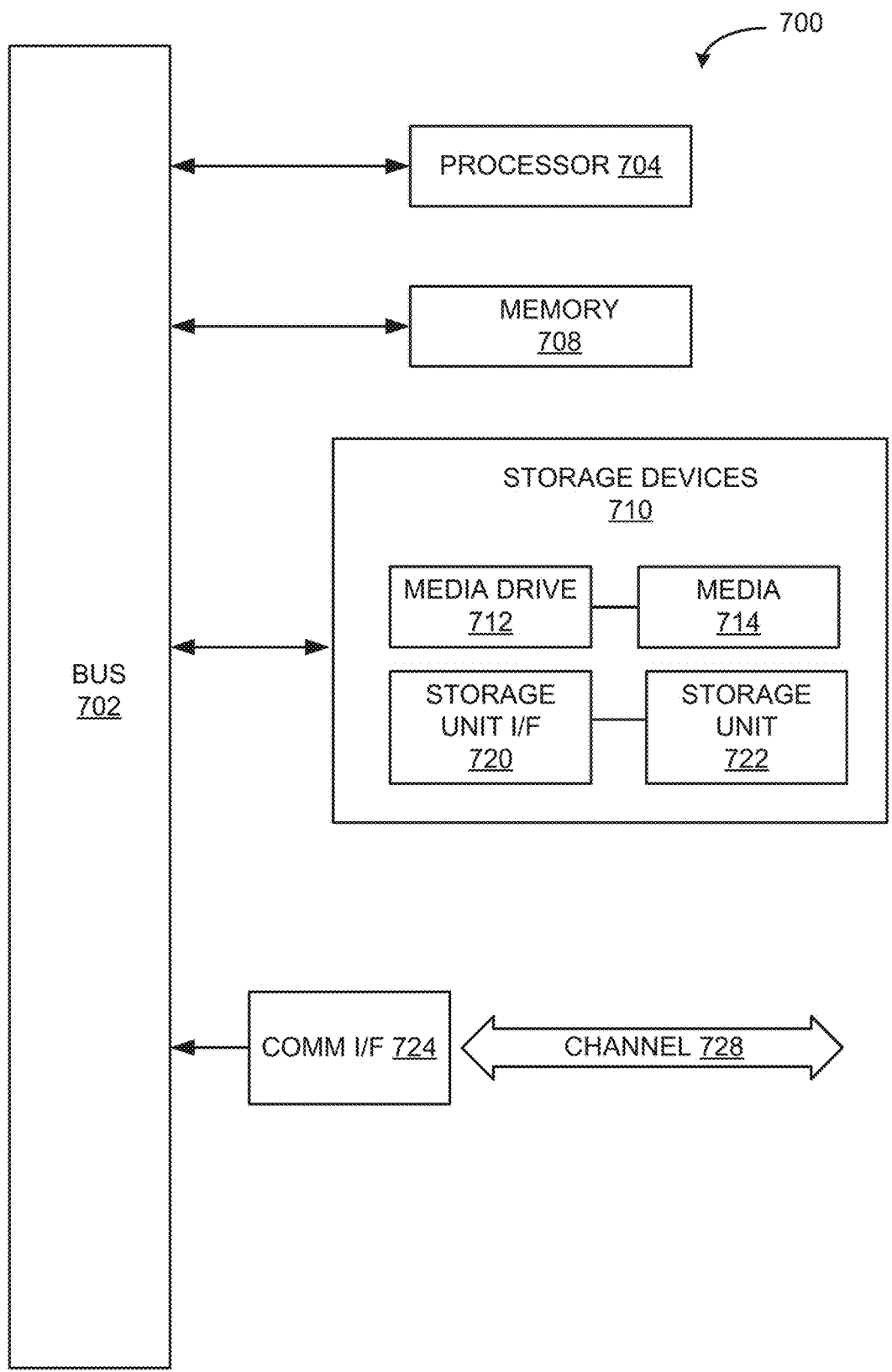
FIG. 7 is an example of a computing module that can be used in conjunction with various embodiments of the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within a desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example navigation systems, portable computing devices, and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 1004. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, an integrated circuit assembly, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 722, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer-readable medium having computer executable program code embodied thereon, the computer executable program code configured to cause a computer system to:
   perform image pre-processing on a document image;
   perform optical character recognition on the document image;
   create a textual data representation of the document image;
   apply processing rules to the textual data representation;
   perform one or more extractions based on the processing rules to extract metadata from the textual data representation and contextualize the extracted metadata;
   perform automated validation of the contextualization of the extracted metadata;
   store the extracted metadata and the textual data representation in a full text index database;
   transfer the extracted metadata and the textual data representation from the full text index database to a search engine platform, the search engine platform indexing and storing the transferred extracted metadata to allow for searching of the indexed, extracted metadata, the indexed, extracted metadata having been correlated to the textual data representation, wherein the search engine platform allows for the selection of extracted metadata stored in full text index database that is transferred to the search engine platform;
   perform additional validation of the extracted metadata upon transfer of the extracted metadata to the search engine platform by correlating at least one of the extracted metadata and the textual data representation with at least one additional reference document relevant to the at least one of the extracted metadata and the textual data representation;
   display at the search engine platform a plurality of facets for filtering of search results; and
   cause the search engine platform to learn from facets utilized in prior searches how to access data from the full text index database.

2. The non-transitory computer-readable medium of claim 1, wherein the computer executable program code is configured to further cause the computer system to receive pre-processing rules feedback for performance of the image pre-processing based upon optical character recognition correction information obtained from correction of the textual data representation subsequent to the performance of the optical character recognition.

3. The non-transitory computer-readable medium of claim 1, wherein the computer executable program code for performing the image pre-processing is configured to cause the computer system to apply a preferred pre-processing profile.

4. The non-transitory computer-readable medium of claim 3, wherein the computer executable program code is configured to further cause the computer system to determine if an output from performance of the optical character recognition meets a desired accuracy threshold.

5. The non-transitory computer-readable medium of claim 4, wherein the computer executable program code is configured to further cause the computer system to output the textual data representation for performance of the one or more extractions upon determining that the output from performance of the optical character recognition meets the desired accuracy threshold.

6. The non-transitory computer-readable medium of claim 4, wherein the computer executable program code is configured to further cause the computer system to apply multiple pre-processing profiles upon which performance of the optical character recognition is based, select the most accurate output from performance of the optical character recognition, and output the textual data representation resulting from the most accurate output from performance of the optical character recognition.

7. The non-transitory computer-readable medium of claim 1, wherein each of the multiple pre-processing profiles comprises at least one combination of image enhancement processing, automatically applied pre-processing, erosion processing, and dilation processing.

8. The non-transitory computer-readable medium of claim 1, wherein the computer executable program code is configured to further cause the computer system to receive research and training feedback for application of the processing rules based upon extraction error correction information obtained from correction of the extracted metadata subsequent to the performance of the one or more extractions.

9. The non-transitory computer-readable medium of claim 1, wherein the one or more extractions comprise at least one of natural language processing extraction, coordinate-based extraction, quadrant-based extraction, and regular expression extraction.

10. The non-transitory computer-readable medium of claim 1, wherein the computer executable program code configured to perform the automated validation of the extracted metadata further causes the computer system to access existing collected data with which to compare the extracted metadata to validate the contextualization of the extracted metadata.

11. The non-transitory computer-readable medium of claim 1, wherein the document image comprises a scanned image of a real estate document.

12. The non-transitory computer-readable medium of claim 11, wherein the extracted metadata comprises at least one of a title of the real estate document, state information associated with the real estate document, county information associated with the real estate document, address of a property relevant to the real estate document, an assessor's parcel number associated with the property, any party name indicated in the real estate document, a document number associated with the real estate document, a recording date associated with the real estate document, any reference document related to the real estate document, and any legal description of the property.

13. The computer program product of claim 1, wherein the computer executable program code is configured to further cause the search engine platform to learn from prior searches conducted on the search engine platform how to access data from the full text index database.

14. The non-transitory computer-readable medium of claim 1, wherein the search engine facets comprise a type of real estate-related document, a county associated property at issue in a real estate-related document, or a date range associated with a real-estate related document.

15. The non-transitory computer-readable medium of claim 14, wherein the search engine facets comprise a type of real estate-related document.

16. The non-transitory computer-readable medium of claim 14, wherein the search engine facets comprise a county associated property at issue in a real estate-related document.

17. A computer-implemented method, comprising:
receiving a plurality of scanned document images representative of real estate-related documents;
performing optical character recognition on the plurality of scanned document images to obtain a plurality of textual data representations of the real estate-related documents;
extracting metadata from the textual data representations of the real estate-related documents, and contextualizing the extracted metadata in a real estate-related context;
performing automated validation of the contextualization of the extracted metadata;
storing the extracted metadata and the textual data representation in a full text index database;
transferring a subset of the extracted metadata and the textual data representation from the full text index database to a search engine platform, wherein the search engine platform selects the subset of extracted metadata stored in the full text index database that is transferred to the search engine platform, the search engine platform indexing and storing the transferred subset of the extracted metadata to allow for searching of the indexed, subset of extracted metadata, the indexed, subset of extracted metadata having been correlated to the textual data representation;
performing validation of the extracted metadata by correlating the extracted metadata with at least one additional reference document relevant to the extracted metadata;
providing a link to the at least one additional reference document and one or more elements of the extracted subset of metadata and the textual data representations as search results based on one or more searches for real estate-related information using the search engine platform;
displaying at the search engine platform a plurality of facets for filtering of the search results; and
causing the search engine platform to learn from facets utilized in prior searches how to access data from the full text index database.

18. The computer-implemented method of claim 17, wherein the plurality of displayed facets comprise a plurality of real estate-related facets, the method further comprising: providing the one or more elements of the extracted subset of metadata and the textual data representations as search results categorized in accordance with the plurality of real-estate related facets.

19. A non-transitory computer-readable medium having computer executable program code embodied thereon, the computer executable program code configured to cause a computer system to:
perform optical character recognition on a plurality of scanned document images to obtain a plurality of textual data representations of the real estate-related documents;
extract metadata from the textual data representations of the real estate-related documents, and contextualize the extracted metadata in a real estate-related context;
store the extracted metadata and the textual data representation in a full text index database;
transfer a subset of the extracted metadata and the textual data representation from the full text index database to a search engine platform, wherein the search engine platform selects the subset of extracted metadata stored in the full text index database that is transferred to the search engine platform, the search engine platform indexing and storing the transferred subset of the extracted metadata to allow for searching of the indexed, subset of extracted metadata, the indexed, subset of extracted metadata having been correlated to the textual data representation;

perform validation of the extracted metadata by correlating the extracted metadata with at least one additional reference document relevant to the extracted metadata;

provide data from the at least one additional reference document and at least one of the extracted metadata and the textual data representations as search results based on one or more searches for real estate-related information performed via the search engine platform; and display at the search engine platform a plurality of real-estate related facets for filtering of the search results; and cause the search engine platform to learn from real-estate related facets utilized in prior searches how to access real estate-related data from the full text index database.

\* \* \* \* \*